United States Patent [19]

Kreuzer et al.

[11] Patent Number: 4,908,535
[45] Date of Patent: * Mar. 13, 1990

[54] INSULATED DYNAMO WINDINGS

[75] Inventors: Helmut Kreuzer; Klaus-Peter Meier, both of Schwieberdingen, Fed. Rep. of Germany

[73] Assignee: Robert Bosch GmbH, Stuttgart, Fed. Rep. of Germany

[*] Notice: The portion of the term of this patent subsequent to Jul. 28, 2004 has been disclaimed.

[21] Appl. No.: 262,963

[22] Filed: Oct. 26, 1988

Related U.S. Application Data

[60] Continuation of Ser. No. 4,063, Jan. 16, 1987, Pat. No. 4,782,254, which is a division of Ser. No. 724,799, Apr. 19, 1985, Pat. No. 4,682,410, which is a division of Ser. No. 409,561, Aug. 19, 1982, abandoned.

[30] Foreign Application Priority Data

Nov. 28, 1981 [DE] Fed. Rep. of Germany .... 3147221.4

[51] Int. Cl.[4] ............................................. H02K 15/10
[52] U.S. Cl. ........................................ 310/45; 310/208
[58] Field of Search ..................... 29/596, 605; 310/42, 310/45, 208

[56] References Cited

U.S. PATENT DOCUMENTS

| | | |
|---|---|---|
| 975,425 | 11/1910 | Hensley . |
| 1,171,148 | 2/1916 | Simonsen ............................. 29/605 |
| 2,061,388 | 11/1936 | Schou . |
| 3,244,918 | 4/1966 | Pennell . |
| 3,333,131 | 7/1967 | Bush . |
| 3,877,142 | 4/1975 | Hamano . |
| 4,471,247 | 9/1984 | Cotton ................................. 310/43 |
| 4,616,407 | 10/1986 | Tamaki et al. ....................... 310/45 |
| 4,617,725 | 10/1986 | Holter et al. .......................... 29/605 |
| 4,651,039 | 3/1987 | Yamamoto . |
| 4,682,410 | 7/1987 | Kreuzer et al. . |
| 4,782,254 | 11/1988 | Kreuzer ............................... 310/45 |
| 4,813,126 | 3/1989 | Williamson ........................... 29/605 |

Primary Examiner—Patrick R. Salce
Assistant Examiner—D. Rebsch
Attorney, Agent, or Firm—Frishauf, Holtz, Goodman & Woodward

[57] ABSTRACT

The commutating poles of vehicular-type dc motors, for example for trolley buses or trolley cars, are made by winding, on edge, a copper strip, permitting the wound copper strip to resiliently, spring-like expand so that the individual spiral loops thereof will be slightly spaced from each other, and then exposing the copper strip in a fluidized bed to an insulating powder, for example polyethylene or polyurethane, which is subsequently cured in a hardening or sintering process.

2 Claims, 2 Drawing Sheets

INSULATED DYNAMO WINDINGS

This is a continuation of application Ser. No. 004,063, filed Jan. 16, 1987, now U.S. Pat. No. 4,782,254, issued Nov. 1, 1988, which is a division of application Ser. No. 724,799, filed Apr. 19, 1985, now U.S. Pat. No. 4,682,410, which is a division of Ser. No. 409,561, filed Aug. 19, 1982, now abandoned.

The present invention relates to a direct-current dynamo electric machine, and more particularly to a dc motor suitable as a drive motor for electric road vehicles, such as trolley cares, trolley buses, and the like, and especially to such motors having commutating poles, as well as to the manufacture of making the commutating pole windings.

BACKGROUND dc machines, particularly for vehicular use, are described in the book "Electric Machinery" by Dr. Germar Müller, VEB-Verlag (Publishers) Berlin, p. 295, see also FIG. 16.16 thereof. Other publications describe such motors.

THE INVENTION

It is an object to provide a method and a structure for the commutating poles of dc motors suitable for automotive use, particularly street vehicles, and the like, which permits spark-free commutation while requiring but little space.

Briefly, the commutating poles are wound with a strip of conductive material, typically copper, which is essentially rectangular in cross section, the winding being wound on edge, that is, with the narrower side forming the curved portion, and the wider side of the cross-sectional area being planar and located in spiral planes around the axis of the pole. The respective layers or winding turns are insulated from each other by hardened, typically sintered powder applied in a fluidized-bed apparatus.

DRAWINGS

Figure 1:
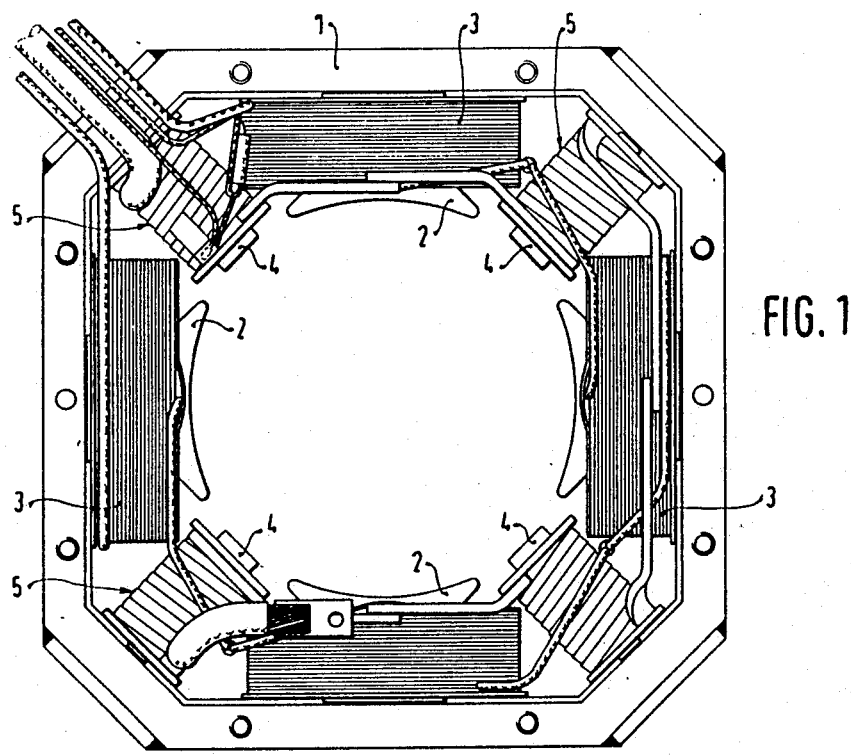
FIG. 1 is an end view of a vehicular-type electric motor having four commutating poles.
Figure 2:
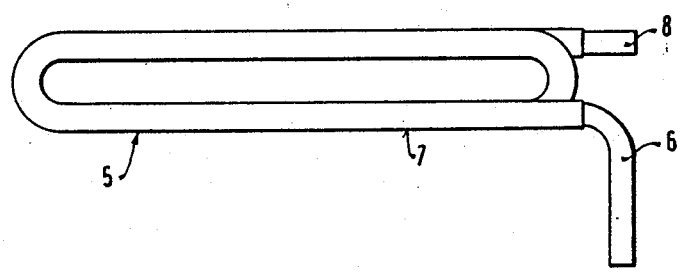
FIG. 2 is a top view of a commutating pole coil.
Figure 3:
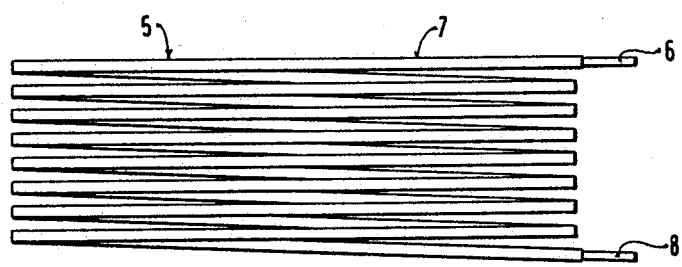
FIG. 3 is a side view, the illustrations of FIGS. 2 and 3 being to an enlarged scale.
Figure 4:
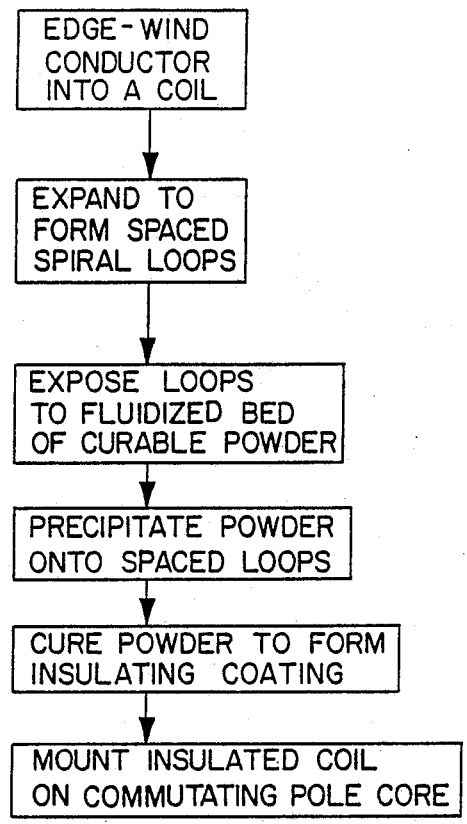
FIG. 4 is a block diagram of the steps of making the windings.

The vehicular-type dc motor has a soft iron armature 1 with four pole shoes 2, each one carrying an exciter winding 3. Four commutating poles 4 are located between the respective main poles 2. Each one of the commutating poles or cores carries a commutating pole winding 5. The commutating pole windings 5 are made of a copper strip 6 which, in cross section, is rectangular. The copper strip 6 is wound on edge, that is, the narrower side of the rectangle forms the curves at the end of the winding, the wider sides of the rectangle forming the top and bottom surfaces of the loops of the windings-see FIGS. 2 and 3. In this specification and claims, this type of winding is referred to as on "edge". The commutating pole windings 5 are so wound that respective winding loops or spirals are slightly spaced from each other. They can be wound tightly but, after having been wound, they will form slightly spaced spirals due to the springiness or resilience of the material, so that the windings will have the configuration, when looked at from the side, as seen in FIG. 3. Initially, the windings are wound with blank or uninsulated copper strip. The respective turns of the windings are insulated from each other by exposing the windings to a fluidized-bed process in which a thin insulating layer 7 of polyethylene, approximately 0.3 mm to 0.4 mm thick, is applied. Any other polymerizable powder which can melt easily can be applied, the powder precipitating on the blank or uninsulated copper of the conductor. After precipitation of the powder on the conductor, it is cured or hardened to a uniform insulating layer 7 on the individual spirals of coalesced powder.

During the fluidized sintering process, the ends 8 of the copper strip are preferably coated with a covering which prevents precipitation of the sinter powder, the covering later on being stripped off. Thus, the end portions of the windings are left uncoated to provide for ease of electrical connection thereto.

Rather than using polyethylene, polyurethane may also be used. The strip-off coating over the ends 8 of the conductor can be removed before or after the sintering process.

We claim:

1. Direct-current dynamo electric machine, having at least two poles (2,4) and a pole winding (5) on each one of the poles, wherein each pole (2,4) is made by the steps of winding a strip of conductive material (6), having essentially rectangular cross-sectional configuration, permitting the thus-formed winding to resiliently expand to form a spiral winding loop, exposing said expanded spaced spiral winding loops to a fluidized bed in which a powder, comprising a curable, hardenable insulating material, is suspended, said powder precipitating in the fluidized bed on said expanded winding loops, hardening said powder to form a uniform coalesced insulating coating on the conductive material (6) forming the pole winding, and mounting the thus-insulated winding on a pole core (2,4).

2. Direct-current dynamo electric machine, having at least two poles (2,4) and a winding (5) on each one of the poles, each pole (2,4) comprising a spiral winding loop of a strip of conductive material (6), each turn thereof being oriented with respect to each adjacent turn with respective major surfaces thereof facing one another and defining therebetween an air gap, and a homogeneous, unstretched, uniform insulating coating bonded to said strip of conductive material (6) and thereby slightly narrowing said air gap between respective turns, and a pole core located within the spiral loop.

* * * * *